United States Patent [19]

Tu

[11] 3,736,572

[45] May 29, 1973

[54] BIPOLAR DRIVER FOR DYNAMIC MOS MEMORY ARRAY CHIP

[75] Inventor: George K. Tu, Wappingers Falls, N.Y.

[73] Assignee: Cogar Corporation, Wappingers Falls, N.Y.

[22] Filed: Aug. 19, 1970

[21] Appl. No.: 65,226

[52] U.S. Cl....340/173 DR, 340/172.5, 340/173 CA, 340/173 R

[51] Int. Cl...........................G11c 11/24, G11c 11/40

[58] Field of Search......................340/173 R, 173 SP, 340/173 DR, 172.5, 173 CA

[56] References Cited

UNITED STATES PATENTS 3,541,530 11/1970 Spampinato..........................340/173

*Primary Examiner*—Terrell W. Fears

*Attorney*—Michael I. Rackman and Harry M. Weiss

[57] ABSTRACT

A bipolar driver for a dynamic MOS memory array chip. The drive signal which is generated consists of a high-level pulse if a read or write operation is to be performed on a cell in the array, followed by an intermediate level pulse if during the same cycle all cells in the array are to be refreshed. A pulse generator is normally operative to apply a high-level potential to an output terminal under the control of an input decoder. When a refresh pulse is to be generated, the pulse generator is made to energize its output terminal independent of the operation of the decoder, but a diversion of current in the pulse generator at this time causes the potential at the output terminal to be at a lower level.

40 Claims, 3 Drawing Figures

INVENTOR
GEORGE K. TU
BY Amster & Rothstein
Harry M Weiss
ATTORNEYS

BIPOLAR DRIVER FOR DYNAMIC MOS MEMORY ARRAY CHIP

This invention relates to dynamic MOS (metal-oxide semiconductor field effect transistor) memory systems, and more particularly to bipolar drivers for dynamic MOS memory array chips.

In the copending application of Allen et al., entitled "Dynamic MOS Memory Array Chip," Ser. No. 65,197 filed on Aug. 19, 1970 (which is hereby incorporated by reference), there is disclosed a dynamic MOS memory array chip utilizing four-device cells. During the refresh cycle, all of the bit/sense line pairs are gated to a charging potential and all of the word lines are pulsed simultaneously so that all cells in the array can be refreshed together. The refresh pulse level applied to all of the word lines is lower than the select pulse level applied to any one of the word lines during a read or write operation.

As disclosed in said Allen et al application, the chief drawback of MOS circuits in semiconductor memories is their low gain-bandwidth compared with that of bipolar circuits using equivalent geometric tolerances. This shortcoming can be minimized by using bipolar circuits to provide the high current drive to the MOS array circuits, and by using bipolar amplifier circuits to detect the low MOS sense currents. If the circuits are partitioned so that all of the devices on a given chip are either bipolar or MOS, no additional processing complexity is added by mixing the two device types in the same system. The use of bipolar support circuits also allows easy interfacing with standard bipolar logic signals; thus, the interface circuits can match standard interface driving and loading conditions.

For the Allen et al. MOS memory chip, it is necessary to provide a select/refresh signal which can be gated to only one or all of the word lines. The select/refresh signal consists of two portions. The first portion is either a ground level or a high level pulse. If a cell in the array is to be operated upon, the high level pulse is generated by the driver circuit and is extended through the decoding circuits on the MOS memory array chip to a single one of the word lines. If no cell in the array is to be operated upon, the high level pulse is not generated and none of the word lines is energized. The second portion of each select/refresh signal consists of either a ground level or an intermediate level pulse. If during the particular cycle it is not necessary to refresh the node capacitances in the array, then an intermediate-level refresh pulse is not generated. On the other hand, if it is necessary to refresh all of the cells in the array, the intermediate level pulse is generated. This intermediate level pulse is extended to all of the word lines so that all of the cells in the array can be refreshed at the same time. It is apparent that a driver circuit for use with Allen et al.-type array chips must be capable of generating a variety of total select-refresh signals to satisfy the variable drive requirements.

It is a general object of my invention to provide a bipolar drive circuit capable of supplying variable select/refresh signals to a dynamic MOS memory array chip of the type disclosed in the Allen et al application.

In accordance with the principles of my invention, the bipolar driver contains three main component circuits. The first and second circuits feed the third. If a particular array chip is to be accessed during the read/write portion of a cycle, the first circuit causes an enabling signal to be applied to the input of the third circuit. The third circuit then energizes its select/refresh output with a high level potential. The third circuit functions to apply a high potential to its output only if the second circuit is disabled. During the select portion of each cycle, the third circuit is disabled. Consequently, if and only if the first circuit determines that the array chip is to be accessed, a high level pulse appears at the select/refresh output of the third circuit; whether or not the pulse is generated is determined solely by the first circuit.

During the second portion of each cycle, the first circuit is forced to supply an enabling signal to the third circuit. Consequently, if a refresh pulse is to be generated, the third circuit is enabled to operate. However, during the refresh portion of a cycle, if a refresh pulse is to be generated the second circuit functions to cause the third circuit to apply a lower potential at the select/refresh output. Thus, if a refresh operation is to take place in any cycle, the lower potential at the select/refresh output of the bipolar driver is controlled solely by the second circuit.

It is a feature of my invention to provide a bipolar driver circuit for a dynamic MOS memory array chip in which an output stage is selectively controlled by a first input stage to apply a high level select pulse to a select/refresh output and is selectively controlled by a second input stage to apply an intermediate level refresh pulse to the select/refresh output.

Further objects, features and advantages of my invention will become apparent upon consideration of the following detailed description in conjunction with the drawing, in which.

Figure 2:
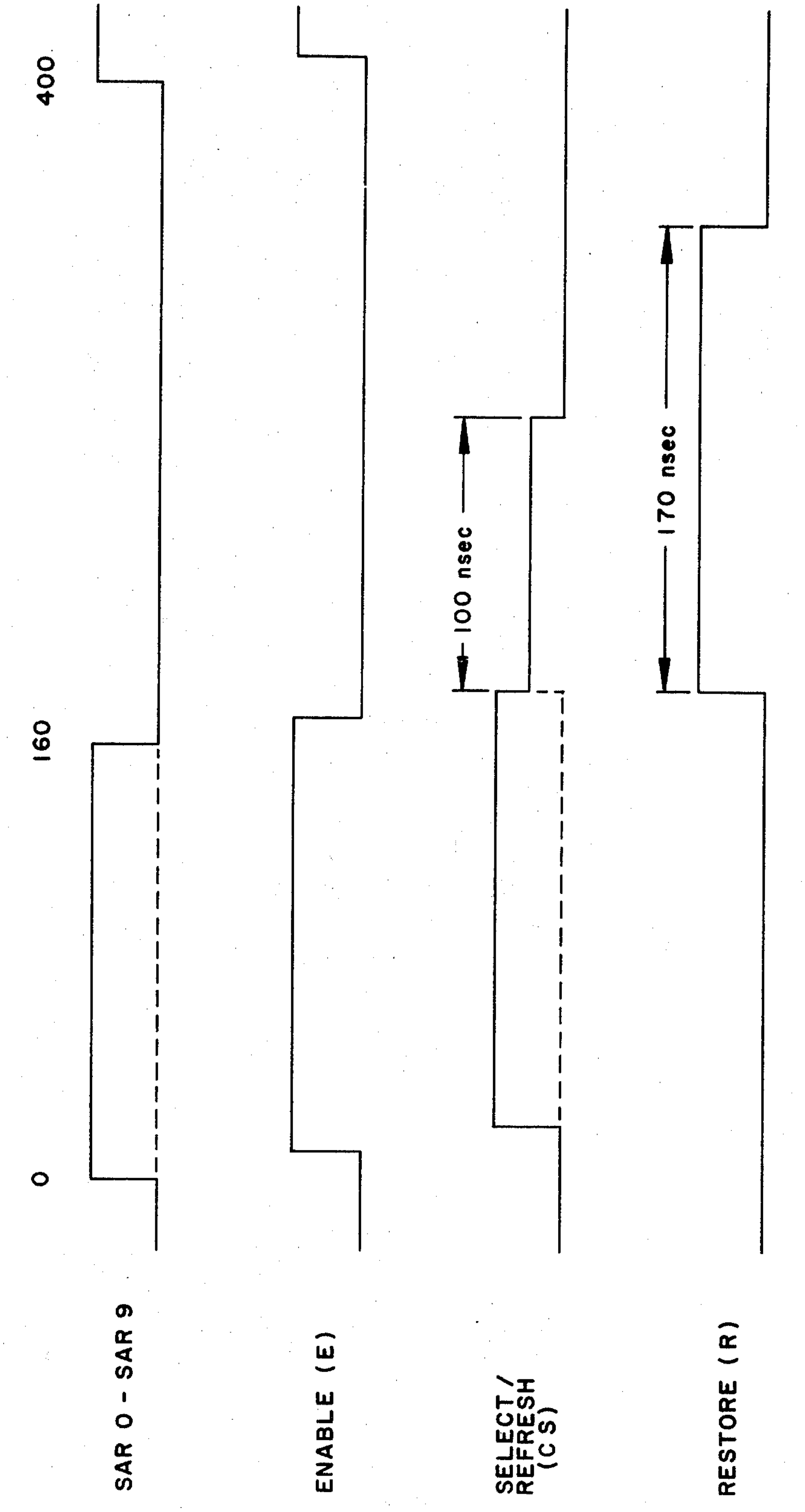
FIG. 2 depicts the waveforms disclosed in the Allen et al application which are necessary for driving the dynamic MOS memory array chip disclosed therein.

Referring to FIG. 2, four different types of signals are extended to the Allen et al. dynamic MOS memory array chip. In a typical memory organization, the address bits which identify a particular cell on a chip are extended to all chips. In the case of chips having 1,024 cells, 10 address bits are required. As shown in FIG. 2, the 10 address signals SAR0–SAR9 consist of positive pulses during the first 160 nanoseconds of each cycle. Depending upon the cell to be identified on each chip, some of the address signals are pulsed high and others are left low.

An enable signal is also transmitted to each chip. This signal is utilized by the inverters on each chip which form complement address signals. The enable signal is not necessary for an understanding of the present invention.

The select/refresh (CS) signal which is transmitted to each chip consists of two parts. The first (select) part is either a high-level pulse or ground potential. Although address bits are extended to every chip in the system, only the chips which contain bits in a word to be operated upon are enabled to operate by the select signal. Thus the CS signal for certain chips may be high during the first portion of the signal or it may be low. During the second portion of the CS signal a lower level (refresh) pulse may appear. This pulse is extended to each chip whether or not a select pulse was previously sent to the chip. The refresh pulse is used to refresh all cells. The advantages of using a refresh pulse whose magnitude is smaller than that of the select pulse is explained in detail in the Allen et al. application.

In some systems it may be desirable to provide a refresh pulse during every cycle; in others, it may only be necessary to provide refresh pulses only every 30th cycle or so. A system for controlling this type of operation is disclosed in the application of Andersen et al entitled "Dynamic MOS Array Timing System," Ser. No. 65,225, filed on Aug. 19, 1970. In the event that a refresh pulse is not supplied to the chips during a particular cycle, the CS signal takes the form of a high-level select pulse or a ground level, followed by a ground level.

The restore (R) pulse is required in the Allen et al array chip both to enable the refresh operation to take place and also to charge certain node capacitances in the inverter and decoder circuits included on the chip. The restore pulse is longer than the refresh pulse by 70 nanoseconds. In the event a refresh pulse is supplied during a particular cycle, the restore pulse is 170 nanoseconds in duration and the duration of the complete cycle is 400 nanoseconds. In the event a refresh pulse is not required, the restore pulse is only 70 nanoseconds in width and the duration of the overall cycle is only 300 nanoseconds.

Figure 1:
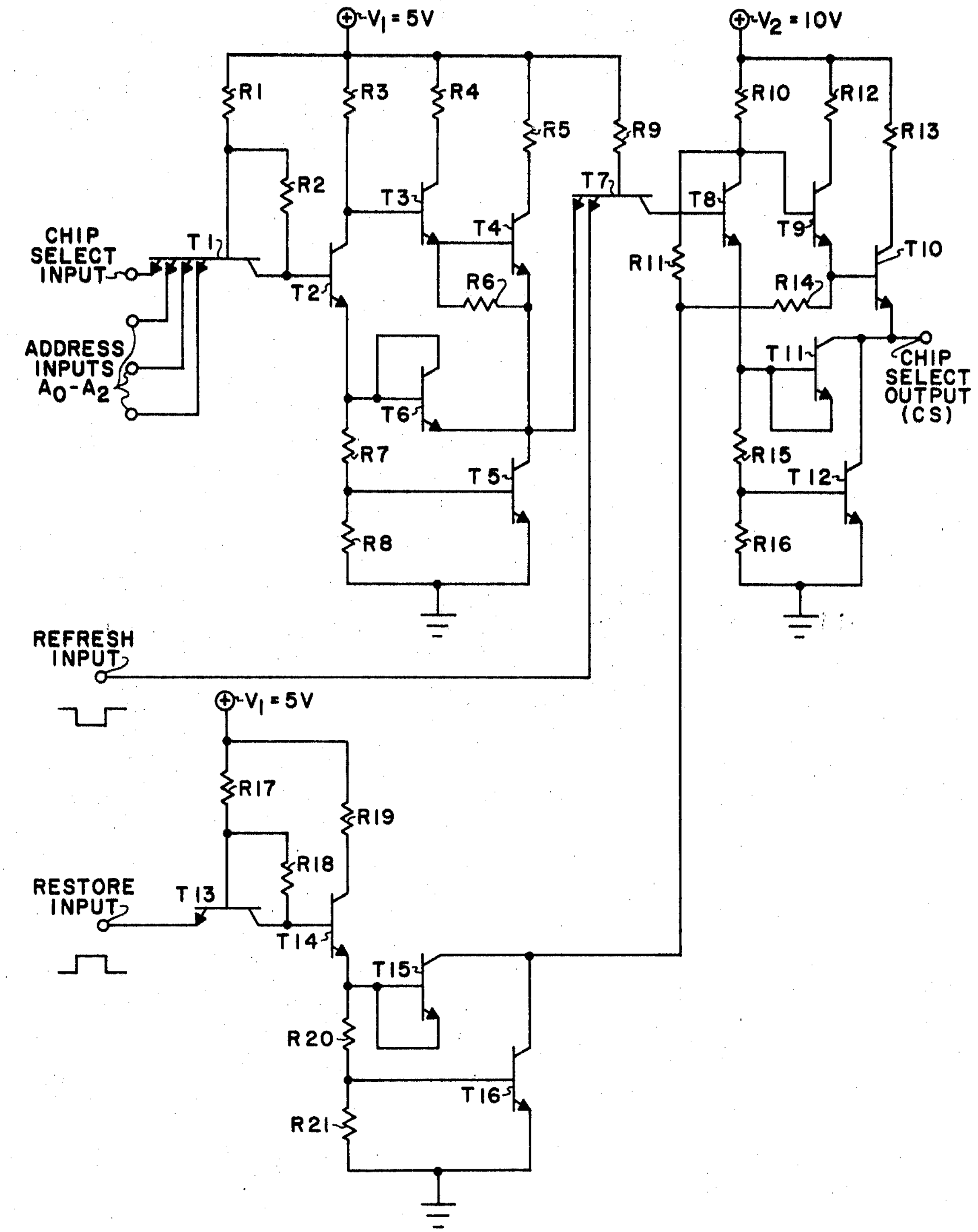
FIG. 1 depicts schematically the illustrative embodiment of my invention.
Figure 3:
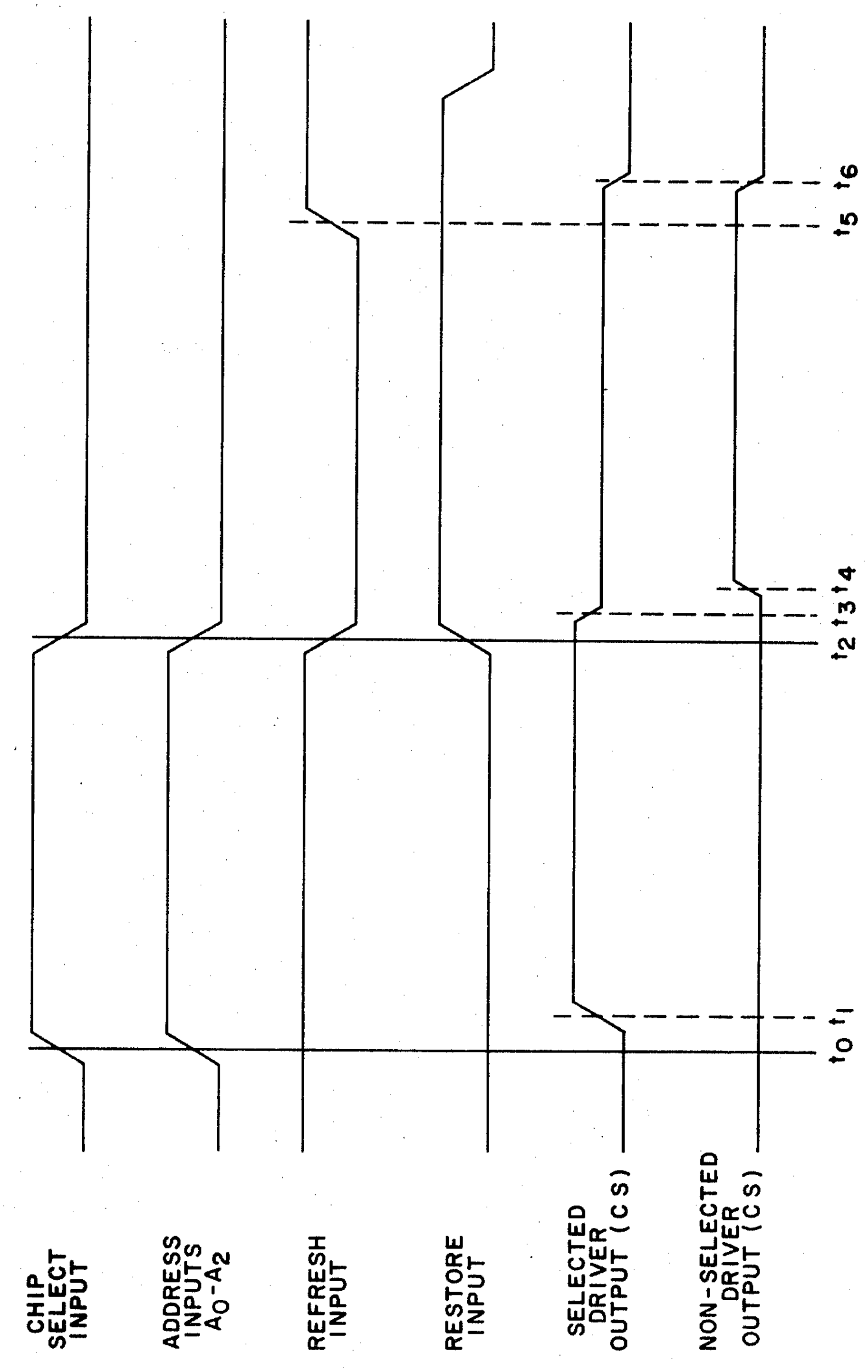
FIG. 3 is a timing diagram which will be helpful in understanding the operation of the circuit of FIG. 1.

FIG. 3 depicts the several signals which are extended to the driver circuit of FIG. 1 and two possible select/refresh CS signals. The waveforms on FIG. 3 are shown with their rise and fall times as opposed to ideal waveforms of the types shown in FIG. 2. One of the inputs to the driver circuit is a chip select signal which occurs between time $t_0$ and time $t_2$. It is the chip select signal, extended to all driver circuits in the memory system, which allows a read or write operation to take place.

Address input bits $A_0$–$A_2$ are extended to each driver. (As will be apparent to those skilled in the art, the number of address inputs depends upon the size of the memory system.) The address inputs consist of true and complement bit signals, and if all of them are high it is an indication that the respective driver is to operate, that is, that a read or write operation is to be performed in the array chip driven by the driver circuit. If all of the address inputs are high, the first portion of the CS signal at the output is high as indicated for the "selected driver output" waveform in FIG. 3. On the other hand, if at least one of the address inputs is low — an indication that the chip driven by the driver of FIG. 1 is not to be operated upon — the first portion of the CS signal is at ground potential as shown by the "non-selected driver output" waveform.

The refresh input signal is ordinarily high and it goes low only if a refresh operation is required during the cycle. If the refresh input is low between times $t_2$ and $t_5$, then the second portion of the CS signal is at an intermediate level. This is true whether or not a select pulse (the first portion of the CS signal) was generated. When a refresh operation is performed, toward the end of the cycle, the CS output of every driver in the system is driven to an intermediate potential level, as shown in both the "selected driver output" and "non-selected driver output" waveforms.

The restore input is ordinarily low but goes high at time $t_2$ when the refresh input goes low. The trailing edge of the restore input pulse occurs after all other signals have returned to ground. It should be noted that in the event a refresh operation is not required, the refresh input remains low throughout the cycle, the second portion of the CS signal (whether or not a pulse was generated during the first portion) remains at ground potential, and the restore input is shortened by 100 nanoseconds as described above.

The circuit for generating the CS signal as a function of the four types of input signals is shown in FIG. 1. Transistor T1 is provided with four emitters, one of which is coupled to the chip select input signal and the other three of which are coupled to the address inputs $A_0$–$A_2$. As long as one of the inputs is low in potential, current flows from source $V_1$ through resistor R1 and the base-emitter junction of transistor T1. The potential at the base, extended through resistor R2 to the base of transistor T2, is insufficient for forward biasing the base-emitter junction of transistor T2.

On the other hand, if all four inputs to transistor T1 are high, the base-emitter junction of transistor T1 is reverse biased. This situation occurs when the chip select input goes high at the start of each cycle provided that all of the address inputs are high as well to indicate that a select pulse is to be generated by the driver circuit for the connected array chip. With no current flowing through the base-emitter junction of transistor T1, the full five-volt potential of source $V_1$ is extended through resistors R1 and R2 to the base of transistor T2. The transistor conducts and current flows from source $V_1$ through resistor R3, the transistor, and resistors R7 and R8 to ground. The positive potential at the junction of resistors R7 and R8 forward biases the base-emitter junction of transistor T5. The collector of transistor T5 is connected through transistor T6 to the junction of the emitter of transistor T2 and one end of resistor R7. The collector and base of transistor T6 are shorted together and thus transistor T6 functions as a diode. The drop across the diode is 0.8 volts and thus the voltage at the collector of transistor T5 is clamped to a level 0.8 volts less than that at the emitter of transistor T2 when it conducts. The function of diode T6 is described in detail in the copending application of George K. Tu, entitled "Non-Saturated Logic Circuits Compatible with TTL and DTL Circuits," Ser. No. 48,200, filed on June 22, 1970. The diode prevents the potential level at the collector of transistor T5 from dropping to that low a level which would result in the saturation of transistor T5. By preventing saturation of transistor T5, the transistor is enabled to turn off rapidly when transistor T2 ceases to conduct.

When transistor T2 conducts its collector potential is approximately 0.2 volts higher than its emitter potential.

Since there is 0.8-volt drop across diode T6, the drop between the collector of transistor T2 and the collector of transistor T5 is approximately 1 volt. This potential difference appears across the base-emitter junctions of transistors T3 and T4, each of which requires approximately a 0.8-volt drop for it to conduct. Consequently, the two transistors remain off. Current which flows into the collector of transistor T5 is derived from source $V_1$, the current flowing from one of the emitter terminals of transistor T7. Consequently, when the driver is selected for operation (with all of the emitters of transistor T1 being held at high potentials), transistor T7 conducts.

On the other hand, when the connected array chip is not to be selected for operation, the base-emitter junction of transistor T1 is forward biased, and transistors T2, T5 and T6 remain off. The 5-volt potential of source $V_1$ is extended through resistor R3 and the base-emitter junctions of transistors T3 and T4 to the collector of transistor T5. The high potential at the collector of transistor T5, connected to one of the emitters of transistor T7, prevents conduction through the emitter.

The refresh input signal is applied directly to the second emitter of transistor T7. This signal is ordinarily high in potential and thus has no effect on the operation of transistor T7. During the select portion of each cycle, conduction of transistor T7 is determined solely by the potentials at the emitters at transistor T1. On the other hand, during a refresh operation, the refresh input is low in potential and the base-emitter junction of transistor T7 is forward biased independent of the states of the address inputs $A_0$–$A_2$.

As will be described below, during the select portion of each cycle when the restore input is low, transistor T16 is off and has no effect on the operation of transistors T8–T12. Consequently, the operation of transistors T13–T16 can be ignored when considering the operation of the output stage of the driver circuit. The circuit including resistors R10, R12, R13, R14, R15 and R16, and transistors T8–T12, is essentially the same as the circuit including resistors R3, R4, R5, R6, R7 and R8, and transistors T2–T6, except for the fact that transistor T11 has its base and emitter shorted together unlike transistor T6 which has its collector and base shorted together, and the fact that resistor R14 is connected between the emitter of transistor T9 and the collector of transistor T16 as opposed to the connection of resistor R6 between the emitters of transistors T3 and T4. The reasons for these differences will be described below. But the basic operations of the two circuits are similar. When transistor T2 conducts, the collector of transistor T5 is low; when transistor T8 conducts, the collector of transistor T12 (the CS output) is low. When transistor T2 does not conduct, the collector of transistor T5 is high in potential; when transistor T8 does not conduct, the CS output is high.

When the driver circuit is selected for controlling an operation on the respective array chip, as described above, transistor T7 has its base-emitter junction forward biased. In such a case, transistor T8 is held off and the CS output is high. This is the required operation. The output stage is powered from source $V_2$ which has a magnitude of 10 volts as opposed to 5-volt magnitude of source $V_1$. This is to insure that when the CS output is pulsed during the select portion of the cycle, a high-voltage, low-impedance source is provided for supplying a large magnitude current to the array chip. With transistor T8 off, the 10-volt potential source $V_2$ is extended directly to the base of transistor T9. There is a 0.8-volt drop across the base-emitter junction of each of transistors T9 and T10, and consequently the potential at terminal CS is 8.4 volts.

When the driver circuit is not selected, no emitter current flows through transistor T7. Instead, base-collector current flows to turn on transistor T8 and to force the CS output to ground (through transistor T12).

The restore input pulse is applied to the emitter of transistor T13. When the pulse is low, the base-emitter junction of transistor T13 is forward biased and transistor T14 remains off. Diode T15 and transistor T16 remain off and effectively are isolated from the output stage of the circuit. However, when the restore input goes high, the base-emitter junction of transistor T13 is reverse biased. The 5-volt potential of source $V_1$ is extended through resistors R17 and R18 to the base of transistor T14. The transistor turns on and current flows from the source through resistor R19,the transistor, and resistors R20 and R21 to ground. Transistor T16 turns on and its collector potential is clamped by diode T15 to a level 0.8 volts lower than the potential at the emitter of transistor T14. Since there is 0.8-volt drop across the base-emitter junction of transistor T14, the potential at the collector of transistor T16 is 0.4 volts when the transistor turns on.

During the refresh portion of the cycle, because transistor T16 conducts, current flows from source $V_2$ through resistors R10 and R11, and transistor T16 to ground. Transistor T8 is held off by the refresh input pulse. The potential at the junction of resistor R10 and the collector of transistor T8 is extended through the base-emitter junctions of transistor T9 and T10 to the CS terminal just as it is during the select portion of the cycle (if transistor T8 is held off). But while the potential at the base of transistor T9 is 10 volts and consequently the pulse at the CS terminal has a level of 8.4 volts during the select portion of the cycle, during the refresh portion of the cycle the potential at the collector of transistor T8 is less than 10 volts. This is due to the fact that there is a voltage drop across resistor R10 as a result of current flowing through resistors R10 and R11, and transistor T16 to ground. The ratios of resistors R10 and R11 and the 0.4-volt drop from the collector of transistor T16 to ground are such that during the refresh portion of the cycle the collector of transistor T8 is held at a level of 6.6 volts. Consequently, the 1.6-volt drop across the base-emitter junctions of transistors T9 and T10 produces a 5-volt level at the CS output.

The refresh pulse is generated independent of the address inputs; all that is required is for the refresh input pulse to be present to indicate that a refresh operation is necessary. The restore pulse, by turning on transistor T16, causes the refresh pulse at the CS output to be at a 5-volt level rather than the 8.4-volt level of the select pulse.

Resistor R6 is required in the circuit for allowing the base potential of transistor T4 to drop when transistor T2 turns on and transistor T3 turns off. However, resistor R14 is not connected to the emitter of transistor T10. During time intervals $t_2$–$t_3$ and $t_5$–$t_6$, it is desired that the base potential of transistor T10 drop quickly in order to reduce the fall time. Since the restore input is high during both of these intervals, transistor T16 is on and provides a large off-drive current to quickly discharge the base of transistor T10. (Resistor R14 could be connected between the base of transistor T10 and ground. However, the connection shown dissipates less power. Since resistor R14 is returned to the collector of transistor T16, current flows through the resistor only when transistor T16 conducts. Thus power is dissipated in the resistor only during the refresh portion of each cycle rather than during the select portion as well. Were resistor R14 returned to ground, current would flow through it during the select portion of the CS signal as well as the refresh portion.)

It should be noted that although the address inputs cause the select pulse to be generated, the leading and trailing edges of the select pulse in the CS signal are delayed by ($t_1$–$t_0$) and ($t_3$–$t_2$) respectively due to delays in propogation from transistor T1 to transistor T10. Although the refresh input causes the refresh pulse to be generated, the refresh pulse is also delayed due to transistor propagation times.The leading edge of the selected driver output CS refresh pulse occurs slightly earlier (at $t_3$ rather than $t_4$) than the leading edge of the non-selected driver output CS refresh pulse because in the former case transistor T12 is already off when the refresh input goes low.

All three of transistors T6, T11 and T15 serve as diode clamps. However, transistor T6 has its collector and base shorted together while the other two transistors have their emitters and bases shorted together. This is due to the fact that a base-to-collector diode (transistors T11 and T15) has a higher breakdown voltage, in the order of 15 volts, as compared to a 6.5-volt breakdown voltage of a base-to-emitter diode. Since each of diodes T11 and T15 is included in a circuit in which the 10-volt potential of source $V_2$ can be extended to the effective cathode, as opposed to diode T6, to the effective cathode of which only a 5-volt potential is extended, larger breakdown voltages are required.

Although the invention has been described with reference to a particular embodiment, it is to be understood that this emobdiment is merely illustrative of the application of the principles of the invention. Numerous modifications may be made therein and other arrangements may be devised without departing from the spirit and scope of the invention.

What I claim is:

1. A driver circuit for deriving a drive signal for extension to a dynamic MOS memory array chip comprising first, second, and third circuit means, said third circuit means having an output terminal and being normally operative when enabled for producing a large-magnitude signal at said output terminal, said first circuit means including means responsive to address input signals indicating that a read or write operation is to be performed on said array chip for enabling the operation of said third circuit means, said second circuit means including means responsive to a restore input signal for causing said third circuit means to produce a lower-magnitude signal at said output terminal, and means for enabling the operation of said third circuit means independent of the enabling thereof by said first circuit means.

2. A driver circuit for deriving a drive signal for extension to a dynamic MOS memory array chip in accordance with claim 1 wherein said means for enabling the operation of said third circuit means independent of the enabling thereof by said first circuit means is operated simultaneously with said second circuit means.

3. A driver circuit for deriving a drive signal for extension to a dynamic MOS memory array chip in accordance with claim 2 wherein said third circuit means includes a transistor at the input thereof having a base terminal which is de-energized responsive to the operation of said first circuit means or the operation of said enabling means, a potential source, first resistance means connected between said potential source and the collector of said input transistor, second resistance means connected from said second circuit means to the junction of said first resistance means and said collector terminal, and means for extending the potential at the collector of said input transistor to said output terminal, said second circuit means when unoperated preventing current flow through said second resistance means thereby allowing a large potential at the collector of said input transistor to be extended to said output terminal and when operated for conducting current through said second resistance means thereby lowering the potential at the collector of said input transistor which is extended to said output terminal.

4. A driver circuit for deriving a drive signal for extension to a dynamic MOS memory array chip in accordance with claim 3 wherein said first circuit means includes a double-emitter transistor having its collector terminal connected to the base of said input transistor, a first of the emitters being connected to said enabling means, and means for varying the potential at the second of the emitters in accordance with the address input signals supplied to said first circuit means.

5. A driver circuit for deriving a drive signal for extension to a dynamic MOS memory array chip in accordance with claim 1 wherein said third circuit means includes a transistor at the input thereof having a base terminal which is de-energized responsive to the operation of said first circuit means or the operation of said enabling means, a potential source, first resistance means connected between said potential source and the collector of said input transistor, second resistance means connected from said second circuit means to the junction of said first resistance means and said collector terminal, and means for extending the potential at the collector of said input transistor to said output terminal, said second circuit means when unoperated preventing current flow through said second resistance means thereby allowing a large potential at the collector of said input transistor to be extended to said output terminal and when operated for conducting current through said second resistance means thereby lowering the potential at the collector of said input transistor which is extended to said output terminal.

6. A driver circuit for deriving a drive signal for extension to a dynamic MOS memory array chip in accordance with claim 5 wherein said first circuit means includes a double-emitter transistor having its collector terminal connected to the base of said input transistor, a first of the emitters being connected to said enabling means, and means for varying the potential at the second of the emitters in accordance with the address input signals supplied to said first circuit means.

7. A bipolar circuit for deriving a drive signal for extension to a dynamic MOS memory array chip comprising first, second, and third circuit means, said third circuit means having an output terminal and being normally operative when enabled for producing a large-magnitude signal at said output terminal, said first circuit means including means responsive to address input signals indicating that a read or write operation is to be performed on said array chip for enabling the operation of said third circuit means, said second circuit means including means responsive to a control input signal for causing said third circuit means to produce a lower-magnitude signal at said output terminal.

8. A bipolar driver circuit for deriving a drive signal for extension to a dynamic MOS memory array chip in accordance with claim 7 further including means for enabling the operation of said third circuit means independent of the enabling thereof by said first circuit means operated simultaneously with said second circuit means.

9. A bipolar driver circuit for deriving a drive signal for extension to a dynamic MOS memory array chip in accordance with claim 8 wherein said third circuit means includes a transistor at the input thereof having a base terminal which is de-energized responsive to the operation of said first circuit means or the operation of said enabling means, a potential source, first resistance means connected between said potential source and the collector of said input transistor, second resistance means connected from said second circuit means to the junction of said first resistance means and said collector terminal, and means for extending the potential at the collector of said input transistor to said output terminal, said second circuit means when unoperated preventing current flow through said second resistance means thereby allowing a large potential at the collector of said input transistor to be extended to said output terminal and when operated for conducting current through said second resistance means thereby lowering the potential at the collector of said input transistor which is extended to said output terminal.

10. A bipolar driver circuit for deriving a drive signal for extension to a dynamic MOS memory array chip in accordance with claim 9 wherein said first circuit means includes a double-emitter transistor having its collector terminal connected to the base of said input transistor, a first of the emitters being connected to said enabling means, and means for varying the potential at the second of the emitters in accordance with the address input signals supplied to said first circuit means.

11. A bipolar driver circuit for deriving a drive signal for extension to a dynamic MOS memory array chip in accordance with claim 8 wherein said third circuit means includes a potential source, and voltage divider means connected between said potential source and said output terminal, said second circuit means when unoperated limiting current flow through part of said voltage divider means thereby allowing a large potential to be extended to said output terminal and when operated for enabling current flow through said part of said voltage divider means thereby lowering the potential which is extended to said output terminal.

12. A bipolar driver circuit for deriving a drive signal for extension to a dynamic MOS memory array chip in accordance with claim 7 wherein said third circuit means includes a potential source, and voltage divider means connected between said potential source and said output terminal, said second circuit means when unoperated limiting current flow through part of said voltage divider means thereby allowing a large potential to be extended to said output terminal and when operated for enabling current flow through said part of said voltage divider means thereby lowering the potential which is extended to said output terminal.

13. A driver circuit for deriving a drive signal for extension to a dynamic MOS memory array comprising an output terminal, first means operative when a read or write operation is to be performed in said array for controlling the generation of a first signal at said output terminal, and second means operative when a refresh operation is to be performed in said array for controlling the generation of a second signal, different from said first signal, at said output terminal.

14. A driver circuit for deriving a drive signal for extension to a dynamic MOS memory array in accordance with claim 13 wherein during any cycle of operation said first and second means are operative to selectively control the generation at said output terminal of none, either or both of said first and second signals.

15. A driver circuit for deriving a drive signal for extension to a dynamic MOS memory array in accordance with claim 14 wherein each of said first and second signals are pulses of the same polarity but of different magnitudes.

16. A driver circuit for deriving a drive signal for extension to a dynamic MOS memory array in accordance with claim 15 wherein said first signal is operative to drive a single word line in said array for performing a read or write operation in a single cell in said word line, and said second signal, when applied to all of the word lines in said array, is operative to control the simultaneous refreshing of all cells in the array.

17. A driver circuit for deriving a drive signal for extension to a dynamic MOS memory array in accordance with claim 16 wherein said first and second means are contained on a single bipolar chip.

18. A driver circuit for deriving a drive signal for extension to a dynamic MOS memory array in accordance with claim 13 wherein each of said first and second signals are pulses of the same polarity but of different magnitudes.

19. A driver circuit for deriving a drive signal for extension to a dynamic MOS memory array in accordance with claim 18 wherein said first signal is operative to drive a single word line in said array for performing a read or write operation in a single cell in said word line, and said second signal when applied to all of the word lines in said array, is operative to control the simultaneous refreshing of all cells in the array.

20. A driver circuit for deriving a drive signal for extension to a dynamic MOS memory array in accordance with claim 19 wherein said first and second means are contained on a single bipolar chip.

21. A driver circuit for deriving a drive signal for extension to a dynamic MOS memory array in accordance with claim 13 whrein said first signal is operative to drive a single word line in said array for performing a read or write operation in a single cell in said word line, and said second signal, when applied to all of the word lines in said array, is operative to control the simultaneous refreshing of all cells in the array.

22. A driver circuit for deriving a drive signal for extension to a dynamic MOS memory array in accordance with claim 21 wherein said first and second means are contained on a single bipolar chip.

23. A driver circuit for deriving a drive signal for extension to a dynamic MOS memory array in accordance with claim 13 wherein said first and second means are contained on a single bipolar chip.

24. A driver circuit for deriving a drive signal for extension to a dynamic MOS memory array comprising an output terminal, first means for indicating when a data operation is to be performed in said array, second means for indicating when a refresh operation is to be performed in said array, means for generating a signal at said output terminal responsive to the operation of either of said first and second means, and means for controlling said signal to be at one of two different levels dependent upon whether a data or a refresh operation is to be performed in said array.

25. A driver circuit for deriving a drive signal for extension to a dynamic MOS memory array in accordance with claim 24 wherein said memory array is one of a plurality of memory arrays included in a memory system, said first means is operative during any cycle when a data operation is to be performed on a cell in said memory array, and said second means is operative during any cycle when a refresh operation is to be performed on cells in all of the memory arrays included in said plurality.

26. A driver circuit for deriving a drive signal for extension to a dynamic MOS memory array in accordance with claim 25 wherein said signal generating means and said level controlling means are operative during any cycle of operation first to cause either no signal or the first-level signal to appear at said output terminal and second to cause either no signal or the second-level signal to appear at said output terminal.

27. A driver circuit for deriving a drive signal for extension to a dynamic MOS memory array in accordance with claim 26 wherein each of said first and second level signals are pulses of the same polarity but of different magnitudes.

28. A driver circuit for deriving a drive signal for extension to a dynamic MOS memory array in accordance with claim 27 wherein said first level signal is operative to drive a single word line in said array for performing a read or write operation in a single cell in said word line, and said second level signal, when applied to all of the word lines in said array, is operative to control the simultaneous refreshing of all cells in the array.

29. A driver circuit for deriving a drive signal for extension to a dynamic MOS memory array in accordance with claim 28 wherein the driver circuit is contained on a single bipolar chip.

30. A driver circuit for deriving a drive signal for extension to a dynamic MOS memory array in accordance with claim 24 wherein said signal generating means and said level controlling means are operative during any cycle of operation first to cause either no signal or the first-level signal to appear at said output terminal and second to cause either no signal or the second-level signal to appear at said output terminal.

31. A driver circuit for deriving a drive signal for extension to a dynamic MOS memory array in accordance with claim 30 wherein each of said first and second level signals are pulses of the same polarity but of different magnitudes.

32. A driver circuit for deriving a drive signal for extension to a dynamic MOS memory array in accordance with claim 31 wherein said first level signal is adapted to drive a single word line in said array for performing a read or write operation in a single cell in said word line and said second level signal is adapted for application to all of the word lines in said array for controlling the simultaneous refreshing of all cells in the array.

33. A driver circuit for deriving a drive signal for extension to a dynamic MOS memory array in accordance with claim 32 wherein the driver circuit is contained on a single bipolar chip.

34. A driver circuit for deriving a drive signal for extension to a dynamic MOS memory array in accordance with claim 24 wherein each of the first and second level signals are pulses of the same polarity but of different magnitudes.

35. A driver circuit for deriving a drive signal for extension to a dynamic MOS memory array in accordance with claim 34 wherein said first level signal is adapted to drive a single word line in said array for performing a read or write operation in a single cell in said word line and said second level signal is adapted for application to all of the word lines in said array for controlling the simultaneous refreshing of all cells in the array.

36. A driver circuit for deriving a drive signal for extension to a dynamic MOS memory array in accordance with claim 35 wherein the driver circuit is contained on a single bipolar chip.

37. A driver circuit for deriving a drive signal for extension to a dynamic MOS memory array in accordance with claim 24 wherein the first level signal is adapted to drive a single word line in said array for performing a read or write operation in a single cell in said word line and the second level signal is adapted for application to all of the word lines in said array for controlling the simultaneous refreshing of all cells in the array.

38. A driver circuit for deriving a drive signal for extension to a dynamic MOS memory array in accordance with claim 37 wherein the driver circuit is contained on a single bipolar chip.

39. A driver circuit for deriving a drive signal for extension to a dynamic MOS memory array in accordance with claim 24 wherein the driver circuit is contained on a single bipolar chip.

40. A driver circuit for deriving a drive signal for extension to a dynamic MOS memory array comprising means for generating a signal when a data operation or a refresh operation is to be performed on a cell in said array, and, means for controlling said signal to be at one of two different levels dependent upon whether a data or a refresh operation is to be performed in said array.

* * * * *